United States Patent
Prahlad et al.

(10) Patent No.: US 11,066,097 B2
(45) Date of Patent: Jul. 20, 2021

(54) POWER STEERING SYSTEMS

(71) Applicant: TRW Limited, Solihull (GB)

(72) Inventors: Nikhil Prahlad, Solihull (GB); Sankar Cherangara, Cheltenham (GB)

(73) Assignee: ZF Automotive UK Limited

( * ) Notice: Subject to any disclaimer, the term of this patent is extended or adjusted under 35 U.S.C. 154(b) by 364 days.

(21) Appl. No.: 16/307,176

(22) PCT Filed: Jun. 6, 2017

(86) PCT No.: PCT/GB2017/051639
§ 371 (c)(1),
(2) Date: Dec. 5, 2018

(87) PCT Pub. No.: WO2017/212251
PCT Pub. Date: Dec. 14, 2017

(65) Prior Publication Data
US 2019/0126975 A1    May 2, 2019

(30) Foreign Application Priority Data
Jun. 6, 2016  (GB) ..................................... 1609872

(51) Int. Cl.
*B62D 5/04*        (2006.01)
(52) U.S. Cl.
CPC ......... *B62D 5/0472* (2013.01); *B62D 5/0463* (2013.01); *B62D 5/0466* (2013.01)
(58) Field of Classification Search
CPC ... B62D 5/0472; B62D 5/0463; B62D 5/0466
(Continued)

(56) References Cited

U.S. PATENT DOCUMENTS

| 5,596,252 A | 1/1997 | Shimizu et al. |
| 6,131,693 A | 10/2000 | Mukai et al. |

(Continued)

FOREIGN PATENT DOCUMENTS

| EP | 1884447 A1 | 2/2008 |
| JP | 2011011660 A | 1/2011 |

(Continued)

OTHER PUBLICATIONS

PCT International Search Report and Written Opinion, Application No. PCT/GB2017/051639, dated Sep. 5, 2017.
(Continued)

*Primary Examiner* — Krishnan Ramesh
(74) *Attorney, Agent, or Firm* — Robert James Harwood

(57) ABSTRACT

An electric power assisted steering system comprises a first part that in use determines the sign of a first signal indicative of the position of a part of the steering, and a second part that in use determines the sign of a second signal indicative of the velocity of a part of the steering. A processing unit that in use determines whether the steering wheel is moving away from a centre position or returning to the centre position from the determined signs of the two signals, and sets a value of a torque damping component using different tunes for when the steering wheel is moving away from the centre and when term and when the steering wheel is returning to the centre. The processing unit may blend the two tunes when it detects a change in the direction of steering corresponding to a return to centre following movement away from centre or movement away from centre following a return to centre.

6 Claims, 3 Drawing Sheets

(58) Field of Classification Search
USPC .......................................................... 701/42
See application file for complete search history.

(56) References Cited

U.S. PATENT DOCUMENTS

| | | |
|---|---|---|
| 2001/0047233 A1 | 11/2001 | Kleinau et al. |
| 2009/0157258 A1 | 6/2009 | Hales et al. |
| 2012/0197493 A1* | 8/2012 | Fujimoto ............. B62D 5/0463 701/41 |
| 2015/0353124 A1* | 12/2015 | Chai ................... B62D 5/0463 701/41 |
| 2015/0375779 A1 | 12/2015 | Varunjikar et al. |
| 2016/0251027 A1* | 9/2016 | Farrelly ............... B62D 5/0463 701/41 |
| 2018/0065660 A1* | 3/2018 | Aoki .................... B62D 5/0466 |

FOREIGN PATENT DOCUMENTS

| | | |
|---|---|---|
| WO | 2011089430 A1 | 7/2011 |
| WO | 2017212251 A1 | 12/2017 |

OTHER PUBLICATIONS

UK Search Report, Application No. GB1609872.5, dated Dec. 1, 2016.

* cited by examiner

POWER STEERING SYSTEMS

This application is a national stage of International Application No. PCT/GB2017/051639, filed 6 Jun. 2017, the disclosures of which are incorporated herein by reference in entirety, and which claimed priority to Great Britain Patent Application No. 1609872.5, filed 6 Jun. 2016, the disclosures of which are incorporated herein by reference in entirety.

BACKGROUND TO THE INVENTION

This invention relates to electrical power assisted steering systems of the kind in which an electrical motor is adapted to apply an assistance torque to a steering component such as a steering column so as to reduce the driver effort required to control the vehicle.

In a simple electric power assisted steering system a torque sensor is provided which is arranged so that the level of torque in a steering column is measured. From this measurement a controller calculates the value of a torque demand signal that is indicative of the torque that is to be generated by an electric motor attached to the steering column. The motor applies a torque to the column of the same sense as that demanded by the driver and thus reduces the effort needed to turn the wheel. As the driver turns the wheel it is desirable to provide very little damping of the wheel when the driver is actively turning the wheel but to provide a higher damping component when the wheel is being allowed to turn when the driver has their hands off the wheel. The torque damping component can take many forms. For instance, it is known in the art to include a torque damping component within the torque demand signal that is used to drive the motor which mimics the mechanical phenomenon of viscous friction that is present in a traditional hydraulic system. This has been found to provide a very natural feel to the steering which is reassuring to the driver.

It is also known to provide a damping component that generally increases in magnitude as a function of steering column velocity from zero torque at zero rotational speed to a maximum at some arbitrary maximum speed. This can be achieved by applying a level of damping that can be modified as a scale factor that depends on the column velocity. In effect, as the torque damping component increases the torque output by the motor decreases, and hence the amount of assistance. This gives increased damping and hence stability at high vehicle speeds, again giving a reassuringly solid feel to the driver and making the vehicle feel more stable at speed. It is known in the prior art to provide a torque damping component which is representative of the sum of a first column velocity term which is a linear function of column velocity and optionally of a second column velocity term which is a function of the square of column velocity, or a higher order factor and in which the torque demand signal is dependent upon the value of the torque damping component.

The damping component with the linear and quadratic terms and the associated gains applied to each of those terms is preset for a given vehicle and the overall function is known as a tune. The steering feel can be altered, or tuned, by changing the gain terms, and this will be set during development of a vehicle. Once set, the gain terms will be stored in a memory for access by the processing unit of the steering system.

In another arrangement, taught in U.S. Pat. No. 8,041, 481B2, the sign of a steering angle is determined as well as the sign of the steering angular velocity. From these signs the direction of movement of the wheel towards or away from the centre position is determined. A first multiplier is applied to the value of the damping component determined by the preset tune when the signs suggest that the wheel is being actively moved away from the central position by a driver, and a second higher multiplier is applied to the value of the damping component set by the same preset tune when the signs suggest that the wheel is being allowed to return to the straight ahead position. This can allow more damping when actively steering away from the centre than when moving back to the centre. A single tune is used at all times.

SUMMARY OF THE INVENTION

A feature of the present invention is to provide an improved steering system that further enhances the steering behaviour and provides a reassuring feel to the driver.

According to a first aspect the invention provides an electric power assisted steering system comprising:

(a) a first part that in use determines the sign of a first signal indicative of the position of a part of the steering, (b) a second part that in use determines the sign of a second signal indicative of the velocity of a part of the steering, and (c) a processing unit that in use determines whether the steering wheel is moving away from a centre position or returning to the centre position from the determined signs of the two signals, and further in which the processing unit sets a value of a torque damping component predominantly or exclusively using a first function which includes both a linear steering column velocity term and optionally a quadratic (or higher factor) steering column velocity term when the steering wheel is moving away from the centre and sets a value of a torque damping component predominantly or exclusively using a second, different, function which includes both a linear steering column velocity term and optionally a quadratic (or higher factor) steering column velocity term when the steering wheel is returning to the centre, the two functions having different tunes, and further in that:

the processing unit is arranged to detect at least one of a change in the direction of steering corresponding to a return to centre following movement away from centre and a movement away from centre following a return to centre and upon detection applies a blend of the first and second functions to ensure a gradual transition in the torque damping component from one function to the other.

The sign of the first signal will indicate which side of the centre position the steering is on, for instance is the steering turned to the left of centre or right of centre. The sign of the second signal will indicate whether the steering is moving in a direction from a first end of travel towards the other or back from the other end of travel towards the first end of travel. For instance, is the wheel being rotated clockwise or anticlockwise. The centre may correspond to a straight ahead position of the steering wheel at which the vehicle will move in a straight line when on a level surface.

By different first and second functions we mean that the functions are tuned differently by the selection of different gains for the linear and optional quadratic terms of the functions. Each function may be of the form:

First function=$-1*(CV*$Linear gain $st$ out+ $CV^2*$quadratic gain $st$ out$*$sign(CV)); and Second function=$-1*(CV*$Linear gain $st$ in $+CV^2*$quadratic gain $st$ in$*$sign(CV))

where CV is the steering column velocity, and linear gain st out, linear gain st in, quadratic gain st out and quadratic gain st out are gain terms that may each vary with velocity of the steering part.

The values of two or more of the gain terms in the two functions may be different to give the different tunes.

The system may include an area of memory in which the two tunes are stored, or in which parameters are stored which can be used by the processing means to construct the two tunes.

The present invention allows different "tunes" to be used based on the steering direction, giving a high degree of freedom in tuning of the behaviour of the system. As it can be assumed that movement away from centre is likely to be driver assisted movement, and movement back to centre an unassisted movement, the invention allows a tune that gives lower damping when driver assisted and higher damping for unassisted movement, providing a good steering behaviour. By additionally providing blending between the two tunes, not unwanted step change in torque damping will arise.

The sign of the signals may be positive for column velocities representing movement in one direction away from centre and negative for movement in the other, and positive for column position one side of centre and negative for column positions that are the other side of centre. The invention will work regardless of the signing convention provided the processing unit is configured to associate the combination of the signs that correspond to movement away from centre with the first function and the two remaining combinations of signs that correspond to movement towards centre with the second function.

To achieve the blending, the processing unit may generate a damping component that is a function of both of the first and the second functions whereby a respective scaling factor is applied to each function, the scaling factors changing over time to provide the transition from a point where one function dominates to a point where the other dominates. The scaling factor applied to one function may vary from 100 percent to 0 percent and for the other function vary from 0 percent to 100 percent over a predefined time to achieve the blending.

When moving from centre the sealing function for the first function may be 100 percent or close to 100 percent with the scaling function of the second function 0 percent of close to zero percent. When moving towards centre the scaling function for the first function may be 0 percent or close to 0 percent with the scaling function of the second function 100 percent of close to 100 percent.

The scaling functions may vary linearly over time during the blending.

The processing unit may set the predefined time over which the blending occurs as a function of the steering part velocity.

The system may exclusively use only one of the two tunes following the completion of the blending period. So for movement away from the centre position the first tune only may be used and for the movement towards the centre position the second tune only may be used.

The tune of the first function may be selected to apply a lower torque damping component than the tune of the second function. This ensures there is less resistance to movement of the wheel when actively steered and more resistance when the wheel is returning to centre.

The values of the gain terms used within each of the two functions may vary with vehicle speed. The processing unit may therefore receive a vehicle speed signal, and the system may include a vehicle speed sensor.

The first column velocity term may comprise a product of the column velocity and a first scaling function. The second column velocity term may comprise a product of the square of the column velocity, or a higher order factor, and a second scaling function. The scaling functions may themselves vary as a function of vehicle speed. The processing unit may perform a mathematical calculation based on the two tunes, storing the two tune functions and the gain terms. In an alternative, sets of values may be predetermined and stored in a look up table. The processing unit does not then need to perform any mathematical function, merely look up the predefined values for a given combination of column velocity and position from the look up table. For example, if a look up table is provided it may contain velocity terms indexed by column velocity CV (or square or higher factor of velocity) and also indexed by vehicle speed. This could, for example, take the form of a 2×2 matrix.

The apparatus may include an area of electronic memory in which the values required to define the tunes are stored and which can be accessed by the processing unit.

The steering column velocity sensor and the steering column position signals may be supplied from separate sensors, or from one combined sensor device.

The processing unit may comprise a signal processing device which runs a program stored in an area of memory, the program causing the processing device to determine the various signs, steering directions and both select tunes and the blends.

The first part and second part of the system may comprise functional sub-parts of the processing unit.

The first signal indicative of the position of the steering may be a direct or indirect measurement of the angular position of a part of the steering such as the steering column, or the angular position of the steering wheel or the angular position of the steered wheels of the vehicle. A sensor that measures the angle may be provided. Alternatively the position of a rack which translates between ends of its range of travel may be measured, the movement of the rack corresponding to movement of the steered wheels. In each case, the measurement may have a defined centre position to allow the sign to be calculated either side of the centre position. Similarly, the second signal indicative of the velocity may be dependent on the velocity of a part of the steering such as the steering wheel, or steering column or steering rack. The position and velocity signals may relate to the same part of the steering or different parts. For instance the position may be derived from a steering column sensor and the velocity from a sensor associated with a steering rack.

The torque damping component may be combined with a torque assistance component to form a torque demand component, and the steering system may include an electric motor which is supplied with a drive signal based upon the torque demand signal so that the motor applies an assistance torque to the steering that supplements the torque applied by the driver. The torque demand signal may represent the torque that is to be applied by the motor.

According to a second aspect there is provided a method of producing a torque damping component for use in an electric power assisted steering system, the method comprising the steps of:

receiving a first signal from a steering velocity sensor indicative of the steering velocity and determining the sign of the first signal, receiving a second signal from a steering position sensor and determining the sign of the second signal, determining whether the steering wheel is moving away from a centre position or returning to the centre position from the determined signs of the two signals, and setting a value of a torque damping component predominantly or exclusively using a first function which includes both a linear function of steering column velocity and a quadratic (or higher factor) function of column velocity when the steering wheel is moving away from the centre and sets a value of a torque damping component predominantly or exclusively using a second, different, function which includes both a linear function of steering column velocity and a quadratic (or higher factor) function of column velocity when the steering wheel is returning to the centre, and the method further comprising:

detecting at least one of a change in the direction of steering corresponding to a return to centre following movement away from centre and a movement away from centre following a return to centre and upon detection applying a blend of the two functions to ensure a gradual transition in the torque damping component from one function to the other.

The steering position sensor and the steering velocity sensor may be combined as a single sensor. They may detect the angular position/velocity of a portion of the steering assembly such as the steering column shaft or may detect the linear position/velocity of a portion such as a steering rack.

The steering position sensor may sense the angular position of a portion of the steering assembly.

Other advantages of this invention will become apparent to those skilled in the art from the following detailed description of the preferred embodiments, when read in light of the accompanying drawings.

DETAILED DESCRIPTION OF THE INVENTION

Figure 1:
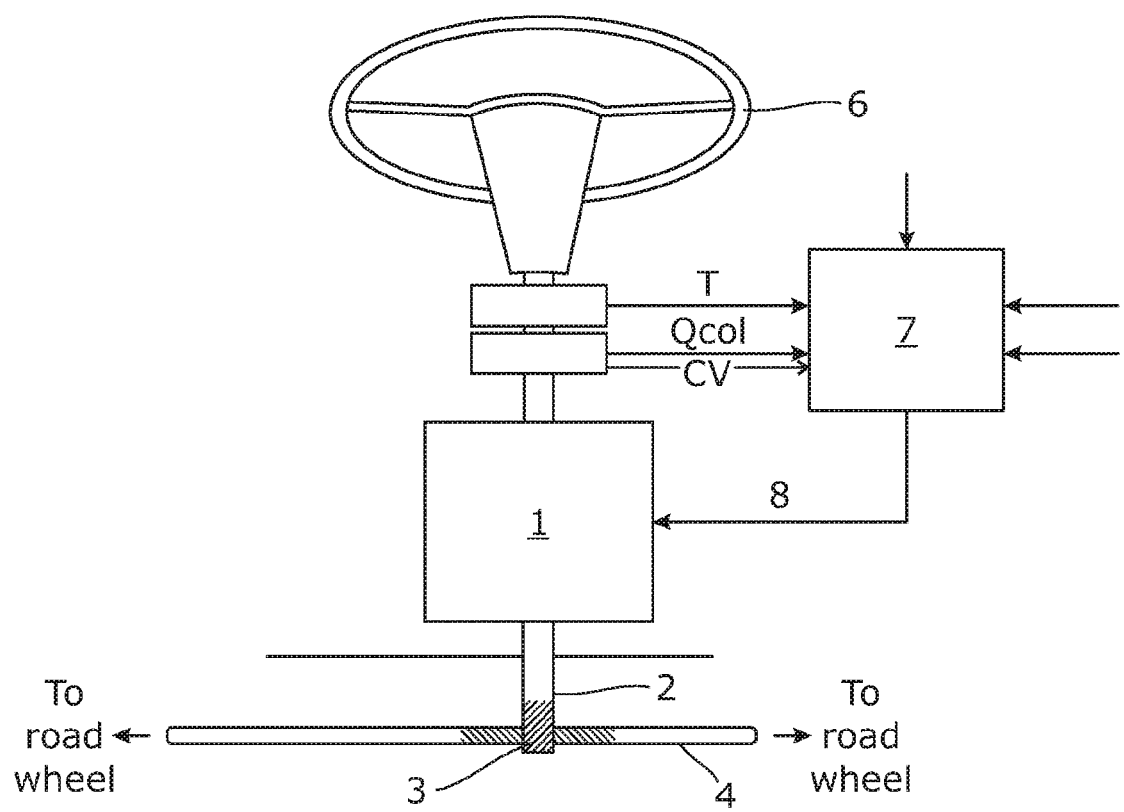
FIG. 1 is a schematic diagram of an electric power assisted steering system in accordance with the present invention.

An electric power assisted steering system is illustrated in FIG. 1 of the accompanying drawings. The system comprises an electric motor 1 which acts upon a steering column shaft 2 that in turns acts through a worm gear and wheel gear assembly 3 onto a steering rack 4. Of course, this is not to be taken as limiting to the scope of protection we are seeking, and other power assisted steering systems are envisaged to which the invention has application.

The steering column shaft 2 carries a torque sensor 5 that is adapted to measure the torque carried by the steering column that is produced by the driver of the vehicle as the steering wheel 6 and hence steering column is turned against the resisting force provided by the vehicles road wheels (also not shown). The output signal T from the torque sensor 5 is fed to a first input of a signal processing unit 7. A combined steering column position and steering column angular velocity sensor 8 is also provided on the steering column shaft 2. This produces an output signal indicative of the angular velocity CV of the shaft 2 and an output signal indicative of the steering column position Qcol. The outputs from the sensor are also fed to a second input of the signal processing unit 7. This may comprise an electronic processor unit or other electronic circuitry.

In addition, the processing unit receives a signal indicative of the drive applied column torque T. The signal processing unit 7 acts upon the input signals to produce, as its output, a torque demand signal 8 that is passed to a motor. The motor controller converts the torque demand signal 8 into drive currents for the electric motor 1. To produce this demand signal the processing unit includes a number of sub-units, each of which performs a single processing step or a specific set of steps.

The value of the torque demand signal 8 corresponds to the amount of assistance torque to be applied to the steering column by the electric motor 1. The value will vary from a minimum value corresponding to maximum output torque for the motor in one sense, through zero torque when the demand signal is zero, to a maximum motor torque of the opposite sense.

The motor controller receives as its input the torque demand signal and produces currents that are fed to the motor to reproduce the desired torque at the motor drive shaft 2. It is this assistance torque applied to the steering column shaft 5 that reduces the effort needed by the driver to turn the wheel. The torque demand signal 8 is made up of at least two parts. The first is an assistance torque value which depends on the amount of torque a driver is applying to the steering column through the wheel. The second part is a damping torque component which is provided in order to improve the steering feel and/or enhance the safety of the system. Other torque demand signals can be used in addition, for example to help to counter the effects of cross winds on the vehicle which can cause it to stray from an intended path. The assistance torque signal is derived as a function of the torque in the steering column as measured by the torque sensor 6. The relationship between the measured torque and the assistance signal is essentially linear. However, other possible relationships may be used to map the torque to the assistance signal. In both cases, as torque increases the magnitude of the assistance signal increases. It will also be understood that the assistance torque signal may be dependent upon other parameters such as vehicle speed if required in that case it is typical to reduce the value of the assistance torque signal at high speeds to enhance stability and increase it at very low speeds to ease parking maneuvers. The damping torque demand signal is a function of column velocity and vehicle speed.

Figure 3:
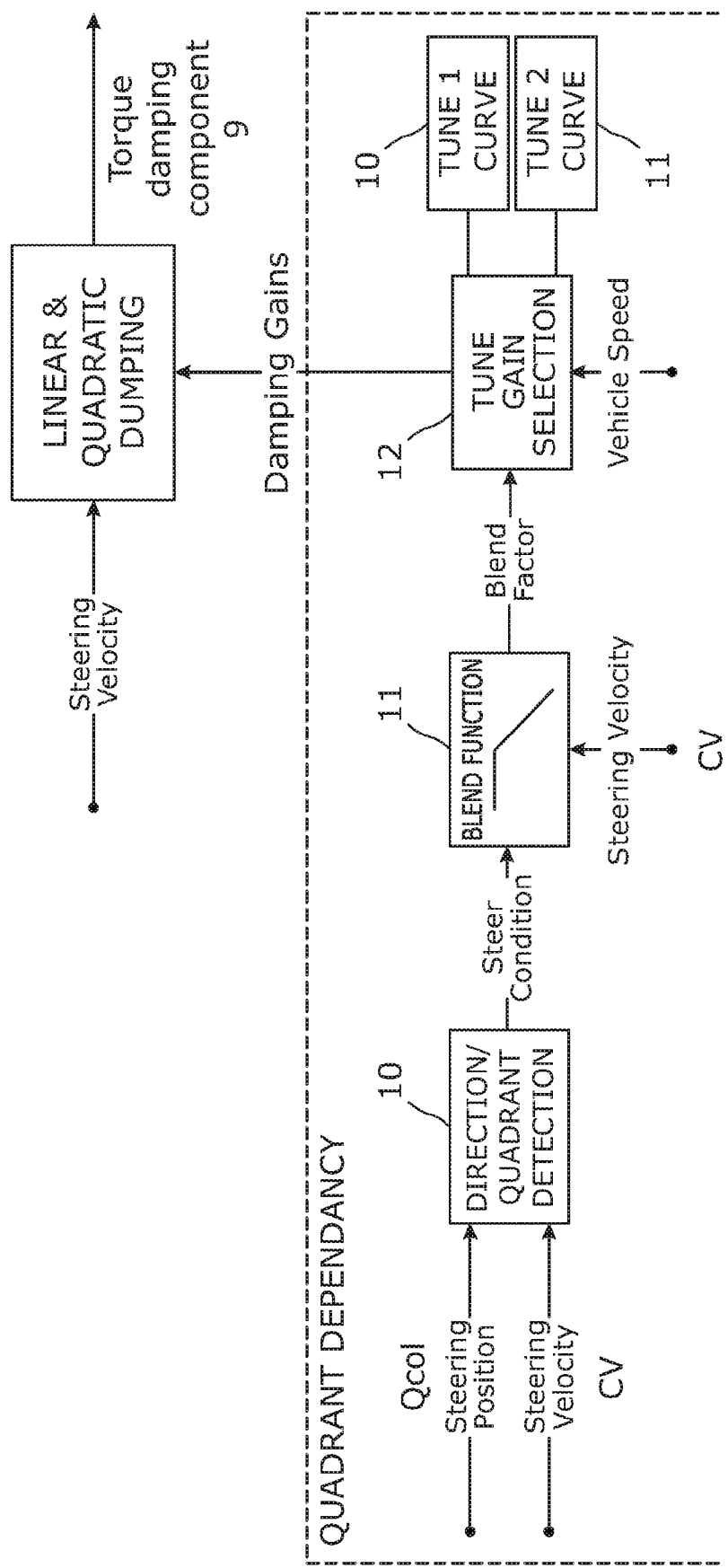
FIG. 3 is a block diagram of the functional subunit of the steering system representing the functionality of the processing unit.

FIG. 3 illustrates the different sub-units of the signal processing unit and the steps undertaken by the signal processing unit 7 to determine damping component. In use this will be added to an assistant torque component to produce an overall torque value for the motor.

The processing unit 7 sets a value of a torque damping component 9 in this example using a combination of two different functions or "tunes" 10, 11. Both functions include both a linear function of steering column velocity and a quadratic (or higher factor) function of column velocity but one is tuned for good steering behaviour when the steering wheel is moving away from the centre and the other for when the steering is moving back towards the centre. The two functions that define the torque damping component may be expressed mathematically as:

First function=$-1*(CV*$Linear gain $st$ out+ $CV^2*$quadratic gain $st$ out$*$sign(CV)); and Second function=$-1*(CV*$Linear gain $st$ in +$CV^2*$quadratic gain $st$ in$*$sign(CV))

In this example, the torque damping component 9 damps the yaw behaviour of the steering. The yaw damping component consists of a quadratic component which enables the damping function to have a higher value at higher column velocities, and a linear term that will provide damping in all conditions where the column velocity is non-zero. The yaw damping component is also of the opposite to the sign of the column velocity signal which introduces a 180 degree phase shift with respect to column velocity. A phase lag of 90 degrees can be added to the yaw torque demand component using a low pass filter with a tunable filter cut off frequency.

To determine which tune to use, the processing unit 7 is arranged to detect 10 the direction of steering corresponding to a return to centre or the direction of movement corresponding to movement away from centre. This is based on the sign of the column position signal and the column velocity sign as shown in FIG. 3. The signs represent two pairs of quadrants—each pair corresponding to movement away from or towards centre. A tune selection subunit 12 then selects the right tune to use.

The applicant has appreciated that the two tunes could be very different, and a sudden change in direction that caused a switch from one tune to the other could give a stepped change in torque damping component that would give a low quality steering feel. To prevent that, the processing unit applies some time dependent blending from one tune to the other to smooth the transition.

Figure 2:
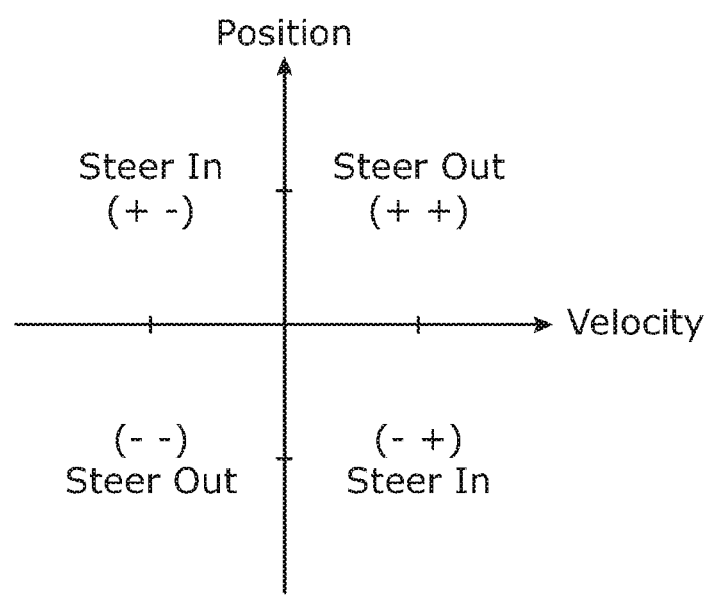
FIG. 2 is a graph showing the column velocity CV on the X axis and column position Qcol on the Y axis to illustrate how the processing unit identifies the movement of the steering towards or away from the centre position from the signs of the two signals.

The blending is achieved by the processing unit detecting the change in velocity (sign) of the steering movement that coincides with a change in the sign of the steering position. In effect the blending is initiated whenever there is a change in quadrant as shown in FIG. 2. Upon detection of the change the processing unit applies a blend of the two tuned functions to ensure a smooth transition in the torque damping component from one function being dominant to the other function being dominant. The scaling factor applied to each function may vary from 100 percent to 0 percent over a predefined time. When at 100 percent then only that function is having an influence, when close to 100 percent (say 90 percent) then it can be said that the function is dominant. When moving from centre the scaling function for the first function may be 100 percent of close to 100 percent with the scaling function of the second function 0 percent of close to zero percent. When moving towards centre the scaling function for the first function may, be 0 percent to close to 0 percent with the scaling function of the second function 100 percent of close to 100 percent.

Where the scaling factor is at 100 percent and the other is at 0 percent, then in effect the damping is set by only one of the functions. Whenever the scaling factor of one exceeds say 90 percent and the other is below say 10 percent, then one of the tunes can be said to be predominant over the other as the other will have only a small influence in the setting of the value of the damping component.

The scaling functions may vary linearly over time during the blending time, or they may vary non-linearly. This provides a gradual transition, which can be very smooth in the case of a linear blending, rather than a sudden step change from one to the other. An example of a non-linear transition that is possible within the scope of the invention would be to change the scaling values in a series of small step changes over the preset time.

Figure 4:
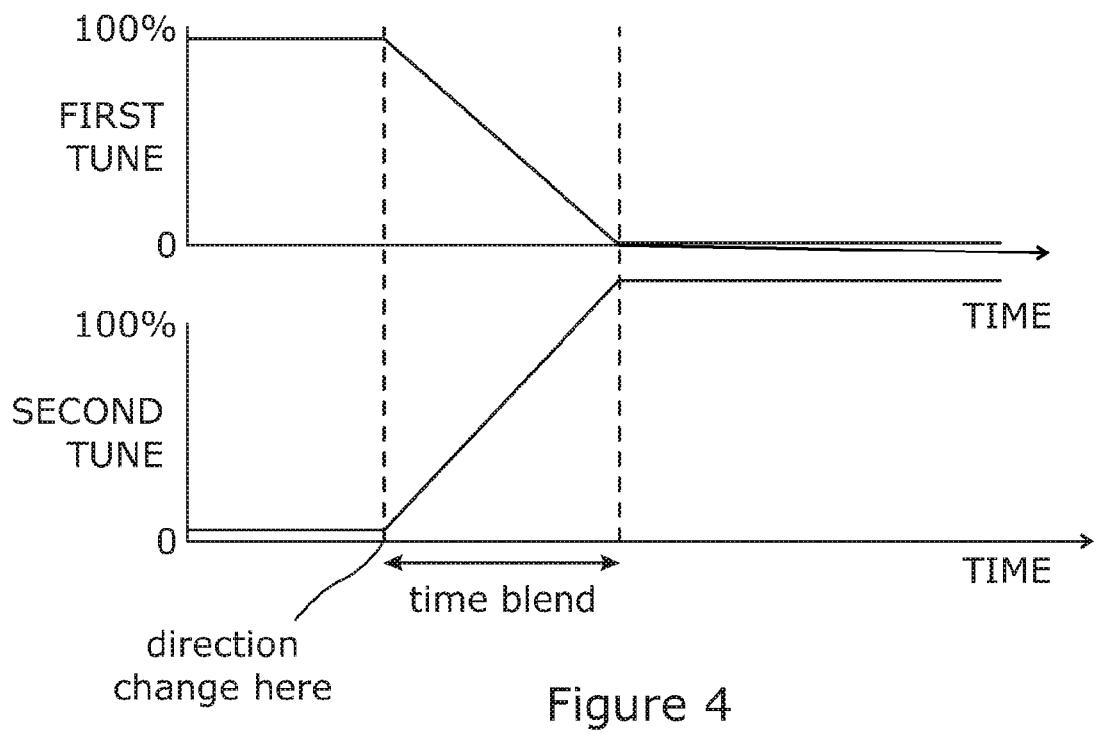
FIG. 4 is a pair of plots to illustrate the blending between first and second tunes that is applied following a change in direction at low column velocity.

FIG. 4 shows the scaling factors applied following a change in direction. As can be seen in FIG. 4 for a relatively low steering column velocity, the time period over which blending is applied varies as a function of the column velocity, and in this case is relatively long to give a gradual blend.

Figure 5:
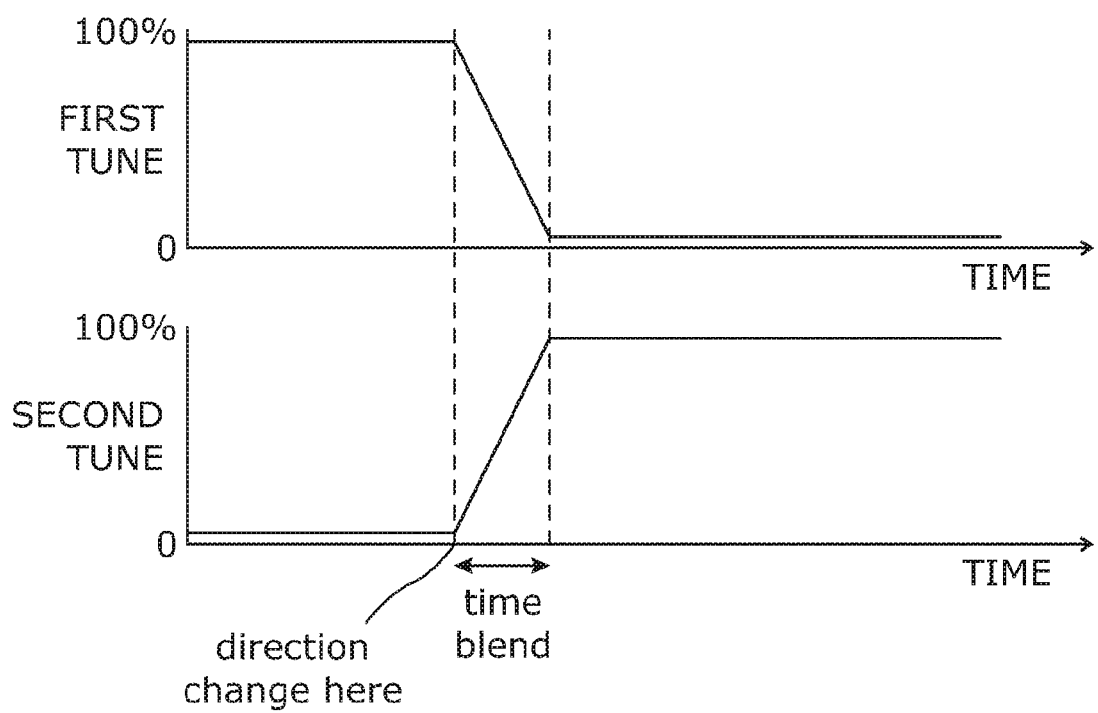
FIG. 5 is a pair of plots corresponding to FIG. 4 for a higher column velocity.

FIG. 5 shows the same event but at a higher steering column velocity. In this case the time over which the blending is completed is much shorter, giving a more rapid blend.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A method of producing a torque damping component for use in an electric power assisted steering system, the method comprising the steps of:
  receiving a first signal from a steering velocity sensor indicative of a steering velocity and determining a sign of the first signal,
  receiving a second signal from a steering position sensor and determining a sign of the second signal, determining whether a steering wheel is moving away from a centre position or returning to the centre position from the determined signs of the first and second signals, and setting a value of the torque damping component using a first function which includes both a linear function of steering column velocity and a quadratic function of column velocity when the steering wheel is moving away from the centre position and sets a value of the torque damping component using a second function different from the first function and which includes both a linear function of steering column velocity and a quadratic function of column velocity when the steering wheel is returning to the centre position,
  detecting at least one of a change in a direction of steering corresponding to a return to the centre position following movement away from the centre position and a movement away from the centre position following a return to the centre position and upon detection applying a blend of the first and second functions to ensure a gradual transition in the torque damping component from one function to the other function, and
  controlling the electric power assisted steering system using the torque damping component.

2. The method according to claim 1, in which the damping component is a function of both of the first and the second functions whereby a respective scaling factor is applied to each function, the scaling factors changing over time to provide a transition from a point where one function dominates to a point where the other function dominates.

3. The method according to claim 2 in which during a blending the scaling factor applied to one function varies from 100 percent to 0 percent over a predefined time and the scaling factor for the other function varies from 0 to 100 percent over a predefined time.

4. The method according to claim 3 in which the scaling factors vary linearly over time during the blending.

5. The method according to claim 1 in which a tune of the first function is selected to apply a lower torque damping component than a tune of the second function.

6. The method according to claim 1 in which the torque damping component is combined with a torque assistance component to form a torque demand component, and the steering system further includes an electric motor which is supplied with a drive signal based upon the torque demand component so that the motor applies an assistance torque to the steering system that supplements a torque applied by a driver.

* * * * *